(12) United States Patent
Holland

(10) Patent No.: US 11,772,487 B2
(45) Date of Patent: Oct. 3, 2023

(54) VEHICLE REAR DRIVE AXLE

(71) Applicant: Ronald A. Holland, Carlsbad, CA (US)

(72) Inventor: Ronald A. Holland, Carlsbad, CA (US)

( * ) Notice: Subject to any disclaimer, the term of this patent is extended or adjusted under 35 U.S.C. 154(b) by 0 days.

(21) Appl. No.: 17/944,493

(22) Filed: Sep. 14, 2022

(65) Prior Publication Data

US 2023/0013969 A1 Jan. 19, 2023

Related U.S. Application Data

(63) Continuation-in-part of application No. 16/590,350, filed on Oct. 1, 2019, now abandoned.

(60) Provisional application No. 62/741,109, filed on Oct. 4, 2018.

(51) Int. Cl.
*B60K 17/04* (2006.01)
*B60K 7/00* (2006.01)

(52) U.S. Cl.
CPC .................. *B60K 17/043* (2013.01)

(58) Field of Classification Search
CPC ......... B60B 35/12; B60B 35/14; B60B 35/18; F16C 35/047; B60K 7/00; B60K 2007/0061; B60K 7/0007; B60K 17/00; B60K 17/043
See application file for complete search history.

(56) References Cited

U.S. PATENT DOCUMENTS

| 1,322,587 | A | 11/1919 | Leclerco |
| 4,561,518 | A | 12/1985 | Grinde |
| 4,834,409 | A | 5/1989 | Kramer |
| 9,132,879 | B2 | 9/2015 | Yelvington |
| 10,710,404 | B2 | 7/2020 | Wiley |
| 2005/0151339 | A1* | 7/2005 | Carty ..................... B60G 21/05 280/124.169 |
| 2007/0241609 | A1* | 10/2007 | Seeds ...................... B62D 7/18 301/132 |
| 2010/0133021 | A1* | 6/2010 | Yen ......................... B60B 35/00 180/21 |
| 2010/0155171 | A1 | 6/2010 | Buschena |
| 2011/0227403 | A1* | 9/2011 | Lawless .................. B60B 35/04 301/125 |
| 2013/0240282 | A1* | 9/2013 | Bindl .................... E02F 3/7663 180/255 |
| 2018/0236367 | A1* | 8/2018 | Bills .................... B60K 7/0007 |

(Continued)

FOREIGN PATENT DOCUMENTS

| DE | 102019006668 A1 * | 3/2021 | |
| GB | 2207975 A * | 2/1989 | ............ B60G 11/23 |
| WO | WO 2019189103 | 10/2019 | |

*Primary Examiner* — Jason D Shanske
*Assistant Examiner* — Daniel M. Keck
(74) *Attorney, Agent, or Firm* — Averill, Green & Kim; Philip Y Kim; Kenneth L Green

(57) ABSTRACT

A rear drive axle assembly includes fixedly attaching right and left axles to right and left rear wheels. Inner ends of the axles residing in a tube and reach in to almost a center of the vehicle, and extend out through self-aligning, pillow block bearings. Sprockets are attached to the axles between outer ends of the tube and the pillow block bearings. Negligible friction between the axles and tube is the only rotational coupling of the axles. The Rigid Tube provides concentricity between the two axles, provides perpendicularity of the drive wheels to the road surface and performs the function of a sleeve bearing.

9 Claims, 1 Drawing Sheet

(56) References Cited

U.S. PATENT DOCUMENTS

2019/0366834 A1* 12/2019 Nagpal ................ B60K 7/0007
2021/0122227 A1*  4/2021 Bindl ..................... B60T 13/12

* cited by examiner

VEHICLE REAR DRIVE AXLE

CROSS-REFERENCE TO RELATED APPLICATIONS

The present application is a Continuation In Part of U.S. patent application Ser. No. 16/590,350 filed Oct. 1, 2019, which claims the benefit of U.S. Provisional Patent Application Ser. No. 62/741,109 filed Oct. 4, 2018, which applications are incorporated in its entirety herein by reference.

BACKGROUND OF THE INVENTION

The present invention relates in general to vehicles intended to be driven on concrete or asphalt road surfaces with two rear wheels, at least one of which is a drive wheel; and more particularly to a new, simple, light weight, more efficient, and less expensive method of keeping the rear wheels turning independently on the same axis.

While driving on a curved path with both of the two rear wheels on the road surface, one wheel must turn faster than the other to keep one of them from skidding. If both rear wheels are driven by a single source they must be driven through a differential which adds a considerable amount of un-sprung weight and cost to the drive axle assembly. The un-sprung weight makes the ride rough and decreases the traction on bumpy roads.

BRIEF SUMMARY OF THE INVENTION

The present invention addresses the above and other disadvantages by providing a rear drive axle assembly fixedly attaching right and left axles to right and left rear wheels. Inner ends of the axles residing in a tube and preferably reach into almost the center of the vehicle and extend out through self-aligning bearings. Drive sprockets, pulleys or gears are attached to the axles between outer ends of the tube and the bearings. Negligible friction between the axles and tube is the only rotational coupling of the axles. The tube generally aligns the axles to be co-axial and functions as a sleeve bearing In accordance with one aspect of the invention, there is provided a vehicle rear drive having bearings mounted to the outer portion of the frame on each side of the vehicle. A tube encases inner ends of the two axles and will operate as a sleeve bearing when one axle has a different RPM than the other. The inner diameter of the tube is large enough to allow the two axles to turn with respect to each other but small enough to keep the two axles turning on about the same axis. When the vehicle is traveling in a straight line, the tube is turning with the axles and when the vehicle is turning right or left at its highest speed, there is very little difference in the speed of the axles, therefore there is no requirement for bearings between the axles and the tube.

In accordance with another aspect of the invention, there is provided a vehicle rear drive having at least one driven sprocket, pulley, or gear fixedly attached to one of the axles between an outer end of the tube and the pillow block bearings, which allows the entire chain, belt, or gear drive to be on the inside of the frame for protection.

In accordance with still another aspect of the invention, there is provided a vehicle rear drive having wheels turning on the same axis and kept nearly vertical in tight turns which increases traction on most road surfaces.

In accordance with yet another aspect of the invention, there is provided a vehicle rear drive without a differential. Eliminating the differential reduces un-sprung weight which improves ride and traction for vehicles with rear suspension, In accordance with another aspect of the invention, there is provided a vehicle rear drive having rear axles and wheels rotationally coupled only by negligible friction between the axles and a tube urging the axles to reside parallel to each other. Each axle is driven by a separate motor and the motors may be operated in opposite directions allowing the vehicle to pivot in place. Such pivoting allows operation in very confined spaces such as warehouses isles.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

Figure 1:
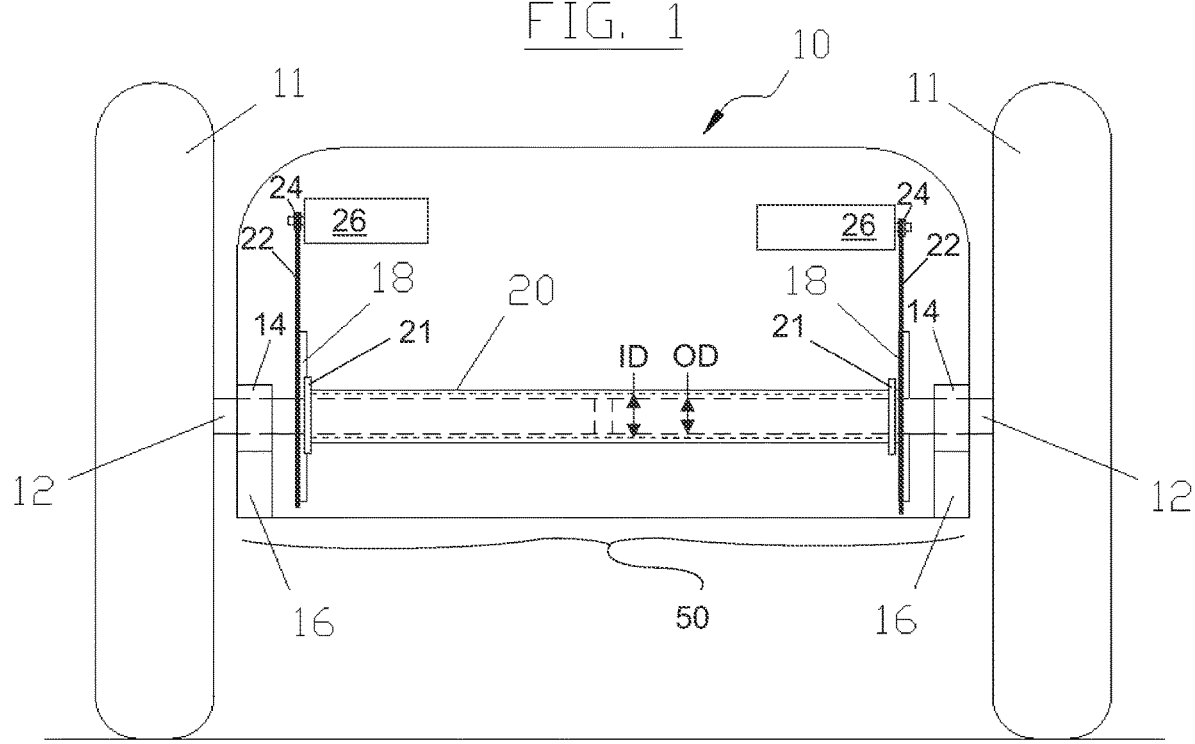
FIG. 1 shows a diagrammatic partial end view of the rear end of a vehicle with a preferred embodiment of the present invention installed.

Referring to FIG. 1, a vehicle rear drive axle system 50 includes wheels 11 fixedly attached to the axles 12 which extend outward through the self-aligning bearings 14, and the axles 12 reach inward to about the center of a rigid hollow structure, for example a rigid tube 20 the axles 12 reside in, or vehicle 10. The bearings 14 are fixedly attached to the frame 16 of the vehicle 10. The driven sprockets, pulleys, or gears 18 are fixedly attached to the axles 12 which allows each wheel 11 to be driven by a separate power source or motor 26.

The tube 20 enclose the axles 12 nearly up to the driven units 18 on each side of the vehicle 10 and the driven units 18 are directly and fixedly rotationally coupled to the corresponding axle 12. Bushings or retaining rings 21 may reside between ends of the rigid tube 20 and the driven units 18. The tube 20 has an inside diameter ID and the axles 12 have an outside diameter OD slightly small than the tube 20 ID which keeps the axles 12 generally co-axial with each other but allows the axles 12 to rotate independently. Each of the axles 12 are free to rotate independently of the other axle 12 only limited by negligible friction between the axles 12 and the tube 20 in all operating conditions. The tube 20 is preferably free to rotate only limited by the negligible friction between the axles 12 and the tube 20 or between ends of the tube 20 and the driven units 18, in all operating conditions. The tube 20, axles 12, driven units 18, and wheels 11 are co-axial.

The motor drive sprockets, pulleys, or gears 24 connect the motors 26 to the driven units 18. The motors 26 may be internal combustion engines with clutches or electric motors. The electric motors may be operated in opposite directions allowing the vehicle 10 to pivot allowing turning in very narrow spaces.

Figure 2:
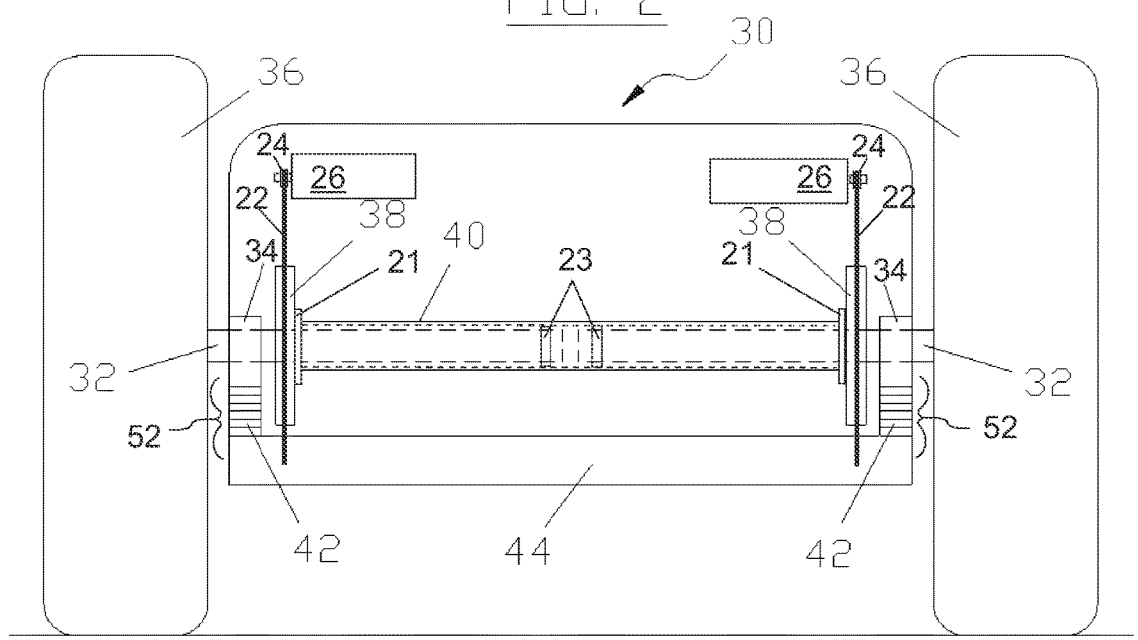
FIG. 2 is similar to FIG. 1 except that the axle assembly is mounted on leaf springs on a heaver vehicle.

FIG. 2 is the same FIG. 1 except that the bearings 34 are fixedly mounted on vehicle suspension system 52 including leaf springs 42 which are mounted on the frame of a heavier vehicle 30 in the conventional manor. There is rigid square tube 44 fixedly mounted on each end to the leaf springs 42 right under the bearings 34 to keep them aligned as the springs 42 flex. Bushings 23 may be provided between the axles 32 and a rigid tube 40 on the heaviest vehicles. The tires 36 are wider to take the added load. The vehicle 30 is otherwise similar to the vehicle 10.

While the invention herein disclosed has been described by means of specific embodiments and applications thereof, numerous modifications and variations could be made thereto by those skilled in the art without departing from the scope of the invention set forth in the claims.

I claim:

1. A vehicle rear drive axle system, comprising:
a vehicle frame supporting a vehicle;
right and left bearings attached to right and left sides of the vehicle frame;
right and left axles passing through the right and left bearings respectively;
a rigid hollow structure residing between the right and left bearings and encasing inner ends of the right and left axles and urging the right and left axles to align co-axially;
the rigid hollow structure free to rotate with respect to the vehicle frame;
the right and left axles independently rotatable with respect to the rigid hollow structure;
right and left wheels attached to outside ends of the right and left axles respectively; and
at least one power source driving either the right or left axle.

2. The vehicle rear axle system of claim 1, wherein:
a sprocket or pulley is attached to the right or left axle between the right or left bearing and a right or left end of the rigid hollow structure; and
the at least one power source connected to the right or left axle through the sprocket or pulley.

3. The vehicle rear axle system of claim 1, wherein the at least one power source comprises a right power source and a left power source driving the right and left axles respectively.

4. The vehicle rear axle system of claim 3, wherein:
sprockets, pulleys, or gears are attached to the right and left axle between the right and left bearings and right and left ends of the rigid hollow structure; and
the power sources drive the right and left axles with chains and sprockets, belts and pulleys, or gears.

5. The vehicle rear axle system of claim 1, wherein the right and left axles reach into the rigid hollow structure proximal to a center of the structure, but do not touch.

6. The vehicle rear axle system of claim 1, wherein the at least one power source is operated in opposite directions to pivot the vehicle.

7. A vehicle rear drive axle system, comprising:
a vehicle frame supporting a vehicle;
right and left leaf springs attached to the right and left sides of the vehicle frame;
right and left bearings attached to the right and left leaf springs respectively;
right and left axles passing through the right and left bearings respectively;
a rigid tube residing between the right and left bearings and encasing inner ends of the right and left axles and urging the right and left axles to align co-axially;
the rigid tube free to rotate with respect to the vehicle frame;
the right and left axles independently rotatable with respect to the rigid tube;
right and left wheels attached to outside ends of the right and left axles respectively; and
at least one power source driving only one of the right or left axle and not driving the rigid tube.

8. A vehicle rear drive axle system, comprising:
right and left bearings attached to the right and left side of a vehicle suspension system respectively;
right and left axles held by the right and left bearings respectively;
a rigid tube residing between the right and left bearings and encasing the right and left axles and urging the right and left axles to align co-axially;
the rigid hollow structure free to rotate with respect to a vehicle frame;
the right and left axles independently rotatable with respect to the rigid tube;
right and left wheels attached to outside ends of the right and left axles respectively; and
at least one power source driving only one of the right or left axle and not driving the rigid tube.

9. A vehicle rear drive axle system, comprising:
right and left bearings attached to the right and left side of a vehicle suspension system respectively;
right and left axles passing through the right and left bearings respectively;
a rigid hollow structure residing between the right and left bearings and encasing the right and left axles and holding the right and left axles to align co-axially;
the rigid hollow structure free to rotate with respect to a vehicle frame;
the right and left axles independently rotatable with respect to the rigid hollow structure;
right and left wheels attached to outside ends of the right and left axles respectively;
a right power source driving only the right axle and not driving the rigid tube; and
a left power source driving only the left axle and not driving the rigid tube.

* * * * *